April 25, 1967     J. T. DONOVAN ET AL     3,315,348

VESSEL LINING METHOD

Filed Jan. 10, 1964

INVENTORS
JOHN T. DONOVAN AND
WILLIAM F. MICK
BY
ATT'YS.

United States Patent Office 3,315,348
Patented Apr. 25, 1967

3,315,348
VESSEL LINING METHOD
John T. Donovan, Baton Rouge, La., and William F. Mick, Midland, Mich., assignors to The Dow Chemical Company, Midland, Mich., a corporation of Delaware
Filed Jan. 10, 1964, Ser. No. 337,036
6 Claims. (Cl. 29—475)

This invention relates to an improved method for lining pipes or similar tubular shaped vessels with plastic and more particularly to a method for bonding a prestressed plastic liner to the inside of a pipe, to promote its resistance to corrosive chemicals even when heated. A permanent bond between the liner and the pipe is effected.

Lined pipe and methods for lining pipe with a plastic lining are not broadly new. Several methods exist which are used quite extensively in the trade.

One such method is described in U.S. Patent No. 2,027,961. There, a tub or liner of vinyl chloride-vinyl acetate copolymer, while still hot, is placed within an iron pipe and then compressed air is supplied to one end of the liner while the other end is plugged. Pressure of about five to ten pounds per square inch forces the liner outwardly against the interior of the pipe. The pressure is maintained while the tube is heated to a temperature of about 110° C. for about fifteen minutes to insure transition of the copolymer through its heat unstable condition to a heat stable condition. If such transition is not permitted to occur, the patent cautions that the lining will tend to loosen from the pipe when its temperature is raised.

Another method is disclosed in the Encyclopedia of Chemical Technology, vol. 14, Interscience, New York, N.Y. (1955). A polyvinylidene chloride lined pipe is made by swaging to size an oversized steel pipe on an extruded saran pipe liner.

While many thousands and probably millions of feet of such lined pipe have been used, the problem of liner distortion and leakage continues to plague the industry. It seems that temperature cycling along with differential coefficients of expansion of the pipe and the liner causes a relaxation of the original stresses within the lined pipe. Such relaxation of stresses results in a loss of the bond between the pipe and the liner, and this permits relative movement subsequently to cause undesirable liner distortion and leakage. Indeed, the leakage is most pronounced at the gasket joints of joined sections of pipe especially when the contents are pressurized. To overcome this problem, the trade has resorted to making indentations on the inside surface of the pipe in the hope that the expansion or swaging, as discussed above, will cause the plastic liner to grip the inside pipe surface. However, this was not found to be the case. Apparently, the plastic liner did not flow into the indentation and if restort was had to heat, the compressive stresses within the liner were relaxed and liner distortion and leakage reoccurred.

An object of this invention is to provide a novel method for permanently bonding a plastic liner to the interior surface of a pipe.

Another object is to provide a novel method for permanently bonding a plastic liner to the interior surface of a pipe without relaxing the internal compressive stresses of said liner.

Still another object is to provide a novel method for bonding a plastic liner to the interior surface of a pipe with a better bond than any heretofore achieved in commercial practice.

A further object is to provide a method for permanently bonding a plastic liner to the interior surface of a pipe which utilizes the compressive stresses of the liner in effecting such a permanent bond.

A still further object is to provide a method of the above character which is relatively fast.

Another object is to provide a method of the above character which can be performed by unskilled labor.

Another object is to provide a method of the above character which can be performed in the field at the site of installation.

Another object is to provide a method of the above character which requires minimal processing apparatus.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

Broadly, the process comprises the steps of inserting a plastic liner within a pipe, the inside surface of which has been scored with indentations. Next, the pipe is swaged down upon the liner to set up compressive stresses within the liner. Then the swaged assembly is passed through an induction heat coil to rapidly raise the temperature of the pipe and, by conductive heat flow, cause the interfacial layer of the plastic liner to melt and flow into the scored indentations without relaxing the compressive stresses within the liner.

More particularly, the process of this invention comprises extrusion of a liner of plastic, such as polyvinylidene chloride or fluoride, the polyvinyls, polyethylene, polypropylene, the polychloro or fluoro ethylenes, halogenated polyethers and the like. The outer diameter of the liner preferably approximates the inner diameter of the pipe to be lined. The pipe may comprise steel, stainless steel, cast-iron, copper, brass, lead, or similar metal customarily used for pipe. The inside surface of the pipe is scored by a picking tool such as a star-shaped wheel which is preferably pulled longitudinally through the pipe to cause indentations on the inside wall. Then the liner is placed within the pipe and the assembly is passed through a swaging machine to cause a swaging of the pipe upon the liner. The swaged assembly is then passed through an induction heat coil which carries sufficient current to cause quick heating of the pipe and a melting of the plastic at the liner-pipe interface. The molten plastic flows into the indentations on the inside surface of the pipe to cause permanent bonding of the liner to the pipe. Since the heat applied is quick and since it has only reached the plastic at the liner-pipe interface, there has been no relaxation of the compressive stresses within the liner so that these stresses continue to act to bond the liner to the pipe. In addition, the anchoring of the outside surface of the liner to the indentations on the inside surface of the pipe enhances the bonding so that a permanent bond is effected.

For a fuller understanding of the nature and objects of the invention, reference should be had to the following detailed description taken in connection with the accompanying drawings in which.

Figure 1:
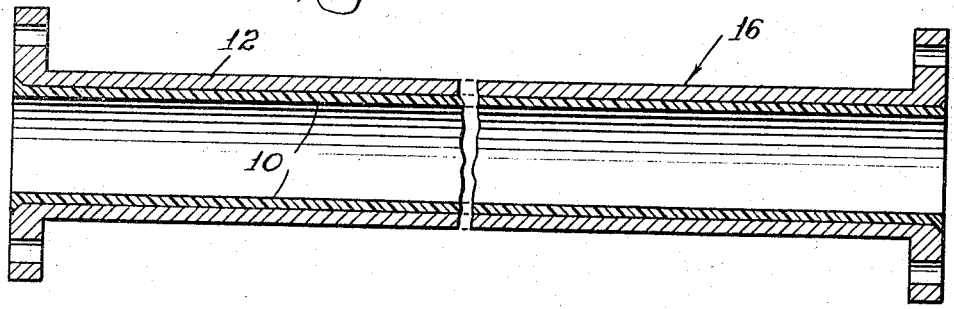
FIG. 1 is a side cross-sectional view of a pipe which has been swaged upon a plastic liner.

The result of the initial steps in the process of this invention is illustrated in FIG. 1. After extrusion of a liner 10 of plastic such as polyvinylidene chloride or fluoride, the polyvinyls, polyethylene, polypropylene, the polychloro or fluoro ethylenes, halogenated polyethers and the like, it is placed into the pipe 12 to be lined. The pipe or any similar tubular shaped vessel may be made of steel, stainless steel, cast-iron, copper, brass, lead and the like. Its inner surface is scored by a series of indentations 14. These indentations are scored into the pipe by pulling a picking tool (not shown) which is preferably a star-shaped wheel, longitudinally through the pipe. The diameter of the wheel is obviously larger than the inner diameter of the pipe to effect such scoring.

The outer diameter of the liner approximates the inner diameter of the pipe and preferably has a clearance no greater than 0.1 inch so that when the pipe 12 is swaged upon the liner 10 by the swaging machine, severe deformation of the walls of the pipe 12 are not necessary.

Figure 2:
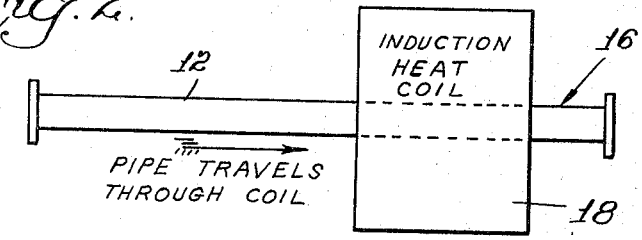
FIG. 2 is a side pictorial view showing the swaged pipe-liner assembly being passed through an induction heat coil.

After such swaging, the swaged pipe-liner assembly, represented by arrow 16 (FIGS. 1 and 2), is passed through an induction heat coil 18. The rate of passage of the coil is dependent upon the inductive heat generated by the coil 18. A quick heating of the pipe and only a surface heating of the liner 10 at the interface is desired. Otherwise, the compressive stresses within the liner will be overcome due to melting or hot flow of the plastic in the liner 10. So, it is customary to pass the assembly through the induction heat coil after and in accordance with calculations as to time, frequency and rate of passage to obtain the above effect. In the preferred form, the pipe-liner assembly is about ten feet long, although shorter or longer lengths are obviously operable.

Figure 3:
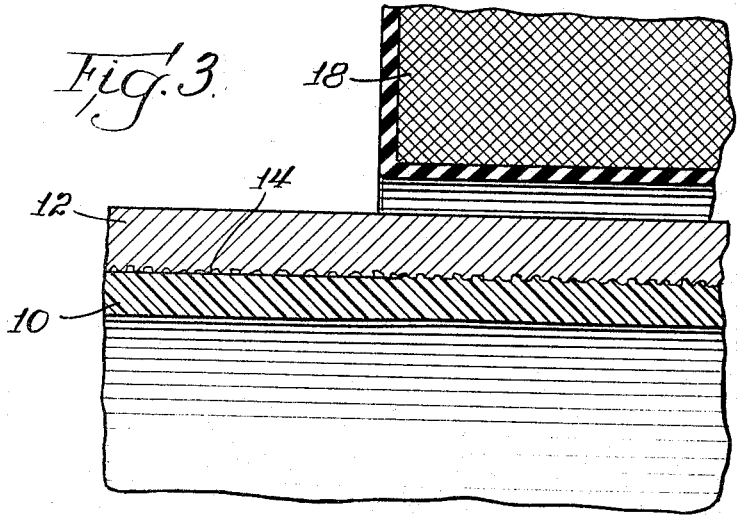
FIG. 3 is a detailed cross-sectional view of the coil and the pipe-liner assembly to illustrate the flow of the plastic at the interface into the pipe indentations to effect permanent bonding.

FIG. 3 illustrates the effect, in detail, of such passage of the pipe-liner assembly through the induction heat coil 18. As noted, the plastic at the pipe-liner interface is heated to cause surface melting into the indentations 14 on the inside surface of pipe 12. There is no melting or substantial softening of the main body of the plastic liner so that it retains its compressive stresses which were created when the pipe 12 was swaged upon the liner.

The following table illustrates the degree of bonding effected by the use of the above-described method:

TABLE

| No. of specimens: | Average force to move liner, lbs. |
| --- | --- |
| 4 | 8,767 |
| 3 | 10,927 |
| 1 | 5,950 |
| 1 | 6,275 |
| 2 | 9,655 |

With respect to the above values, it will be noted that in certain instances (2 and 3), an unusually high average force was necessary to move the liner. In these instances, a rapid quench step was utilized after the pipe-liner assembly had been passed through the induction heat coil. Apparently, the rapid quench effects a freezing of the compressive stresses within the liner so that they enhance the bonding force between the pipe and the liner. It may be desirable to pass a coating liquid through the inside of the liner while inductively heating the outside pipe. This would absolutely insure against liner compressive strength relaxation while melt flow of plastic interface is being achieved.

It will thus be seen that the objects set forth above, among those made apparent from the preceding description, are efficiently attained, and since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

What is claimed is:

1. An improved method for bonding a synthetic resilient plastic liner to the inside surface of a tubular shaped uniformly metal containing vessel comprising the steps of scoring the inside surface of said vessel to form indentations thereon, inserting a tubular synthetic resilient plastic liner within said vessel, swaging the vessel onto said liner to cause compressive stresses within said liner, heating said vessel and said liner at a rate sufficient to melt the interface layer of the liner adjacent said vessel to cause a synthetic resilient flow of said interface layer into the scored indentations but insufficient to relax said compressive stresses within said liner to effect a permanent bond of said liner to said vessel.

2. The method of claim 1 wherein said liner comprises polypropylene.

3. The method of claim 1 wherein said liner comprises polyvinylidene chloride.

4. The method of claim 1 wherein said passage of said pipe-liner assembly is accompanied with cooling of the liner.

5. An improved method for bonding a synthetic resilient plastic liner to the inside surface of a metal pipe comprising the steps of scoring the inside surface of said metal pipe by pulling a scoring tool longitudinally therethrough to form indentations within said surface, inserting a tubular synthetic resilient plastic liner within said metal pipe, the outside diameter of said liner being substantially equal to the inside diameter of said pipe, swaging the pipe into intimate contact with said liner to cause compressive stresses within said liner, passing the resultant pipe-liner assembly through an induction heating coil at a rate sufficient to melt the interface layer of said liner adjacent the pipe to enable a flow of said layer into the scored indentations but insufficient to relax said compressive stresses within said liner to effect a permanent bond of said liner to said pipe after cooling.

6. The method of claim 5 followed by a step which comprises quenching said lined pipe into a cooling medium.

References Cited by the Examiner

UNITED STATES PATENTS

| 2,027,961 | 1/1936 | Currie | 138—141 |
| 2,828,537 | 4/1958 | Pischke et al. | 29—517 |
| 3,050,786 | 8/1962 | St. John et al. | 156—294 |
| 3,104,432 | 9/1963 | Peterson | 29—157 |
| 3,156,042 | 11/1964 | Reed | 29—475 |

JOHN F. CAMPBELL, *Primary Examiner.*

L. J. WESTFALL, *Assistant Examiner.*